United States Patent
Gilbreth et al.

(10) Patent No.: US 6,489,692 B1
(45) Date of Patent: Dec. 3, 2002

(54) METHOD AND APPARATUS FOR CONTROLLING ROTATION OF MAGNETIC ROTOR

(75) Inventors: Mark G. Gilbreth, Simi Valley, CA (US); Joel B. Wacknov, Westlake, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/459,426

(22) Filed: Dec. 13, 1999

(51) Int. Cl.$^7$ .......................... F02M 11/06; H02P 9/04; F01D 15/00; F02C 6/00; H02K 7/08
(52) U.S. Cl. .................. 290/52; 290/40 D; 318/140
(58) Field of Search .................. 318/254, 439, 318/138; 290/40 B, 40 C

(56) References Cited

U.S. PATENT DOCUMENTS

| | | |
|---|---|---|
| 3,775,649 A | 11/1973 | Bayer et al. |
| 3,806,785 A | 4/1974 | DeValroger et al. |
| 4,144,482 A | 3/1979 | Schwab |
| 4,447,787 A | 5/1984 | Schwesig et al. |
| 4,626,761 A | 12/1986 | Blaschke |
| 4,698,577 A | 10/1987 | Seymour et al. |
| 4,763,058 A | 8/1988 | Heining et al. |
| 4,764,712 A | 8/1988 | Blaschke et al. |
| 4,845,418 A | 7/1989 | Conner |
| 4,885,519 A | 12/1989 | Vogelmann |
| 4,926,105 A | 5/1990 | Mischenko et al. |
| 5,179,308 A * | 1/1993 | Malsky ............ 310/90.5 |
| 5,427,455 A | 6/1995 | Bosley |
| 5,497,615 A | 3/1996 | Noe et al. |
| 5,529,398 A * | 6/1996 | Bosley ............ 384/105 |
| 5,572,097 A * | 11/1996 | Cameron ........... 318/254 |
| 5,708,314 A * | 1/1998 | Law ............... 310/103 |
| 5,827,040 A * | 10/1998 | Bosley et al. ...... 415/106 |
| 5,850,732 A | 12/1998 | Willis et al. |
| 5,864,191 A * | 1/1999 | Nagate et al. ...... 310/156.53 |
| 5,886,450 A * | 3/1999 | Kuehnle ........... 310/156.19 |
| 5,899,673 A | 5/1999 | Bosley et al. |
| 5,903,116 A | 5/1999 | Geis et al. |
| 5,915,841 A * | 6/1999 | Weissert .......... 384/104 |
| 5,918,985 A | 7/1999 | Bosley |
| 5,936,370 A * | 8/1999 | Fukao et al. ...... 318/652 |
| 6,070,404 A * | 6/2000 | Bosley et al. ..... 60/39.02 |
| 6,093,975 A * | 7/2000 | Peticolas ......... 290/40 A |
| 6,104,153 A * | 8/2000 | Codilian et al. ... 318/362 |
| 6,130,494 A * | 10/2000 | Schob ............. 310/90.5 |
| 6,265,801 B1 * | 7/2001 | Hashiba et al. .... 310/156.28 |

* cited by examiner

*Primary Examiner*—Nestor Ramirez
*Assistant Examiner*—Julio Gonzalez
(74) *Attorney, Agent, or Firm*—Sterne, Kessler, Goldstein & Fox P.L.L.C.

(57) ABSTRACT

A method and apparatus for starting a turbogenerator having a sensorless magnetic rotor supported for rotation in a stator by a compliant foil fluid film bearing, the method comprising energizing the stator to generate a continuously rotating magnetic field to capture the magnetic rotor and thereafter accelerating the rotational speed of the magnetic field to substantially minimize the time required for the magnetic rotor to reach a liftoff speed associated with the compliant foil fluid film bearing.

13 Claims, 3 Drawing Sheets

METHOD AND APPARATUS FOR CONTROLLING ROTATION OF MAGNETIC ROTOR

TECHNICAL FIELD

The present invention relates to a method and apparatus for capturing a magnetic rotor for acceleration, rotation and deceleration with a rotating magnetic field generated by a stator for use in a turbogenerator including a compliant foil fluid film bearing.

BACKGROUND ART

Compliant foil fluid film radial bearings are currently being utilized in a variety of high speed rotor applications. These bearings are generally comprised of a bushing, a rotating element such as a rotor or a shaft adapted to rotate within the bushing, non-rotating compliant fluid foil members mounted within the bushing and enclosing the rotating element, and non-rotating compliant spring foil members mounted within the bushing underneath the non-rotating compliant fluid foil members. The space between the rotating element and the bushing is filled with fluid (usually air) which envelops the foils. Conventionally, the compliant fluid foil elements are divided into a plurality of individual compliant foils to form a plurality of wedge-shaped channels which converge in thickness in the direction of the rotation of the rotor.

The motion of the rotating element applies viscous drag forces to the fluid in the converging wedge channels. This results in increases in fluid pressure, especially near the trailing edge of the wedge channels. If the rotating element moves toward the non-rotating element, the convergence angle of the wedge channel increases, causing the fluid pressure rise along the channel to increase. Conversely, if the rotating element moves away, the pressure rise along the wedge channel decreases. Thus, the fluid in the wedge channel exerts restoring forces on the rotating element that vary with and stabilize running clearances and prevent contact between the rotating and non-rotating elements of the bearing. Flexing and sliding of the foils causes coulomb damping of any axial or overturning motion of the rotating element of the bearing.

Owing to preload spring forces or gravity forces, the rotating element of the bearing is typically in physical contact with the fluid foil members of the bearing at low rotational speeds. This physical contact results in bearing wear. It is only when the rotor speed is above what is termed the liftoff/touchdown speed that the fluid dynamic forces generated in the wedge channels assure a running gap between the rotating and non-rotating elements.

Compliant foil fluid film radial bearings typically rely on backing springs to preload the fluid foils against the relatively movable rotating element so as to control foil position/nesting and to establish foil dynamic stability. The bearing starting torque (which should ideally be zero) is directly proportional to these preload forces. These preload forces also significantly increase the rotor speed at which the hydrodynamic effects in the wedge channels are strong enough to lift the rotating element of the bearing out of physical contact with the non-rotating members of the bearing. These preload forces and the high liftoff/touchdown speeds result in significant bearing wear each time the rotor is started or stopped.

These compliant foil fluid film radial bearings (air bearings) may be positioned at multiple locations along the rotor in a turbogenerator assembly, such as between the stator, compressor, and turbine wheel. These air bearings are operative to support the shaft at rotational speeds above approximately 8,000 rpms. Rubbing of the rotor against the foil occurs prior to liftoff and after touchdown, which is generally under approximately 8,000 rpms. This rubbing is undesirable because it may cause wear on the foil.

While compliant foil fluid film radial bearings have been specifically described above, much the same considerations apply to compliant foil fluid film thrust bearings which are also currently being utilized in a variety of high speed rotor applications.

The least expensive turbogenerator design includes a sensorless rotor. By "sensorless" it is meant that the system includes no means for determining the rotational position of the rotor because the rotor has no sensors to provide such information. A problem inherent in such a low cost generator is that it may be difficult to capture the rotor for rotation with the stator if the rotational position of the rotor is unknown. The challenge is to not allow the rotor to rotate in contact with the air bearings for prolonged periods of time before liftoff has been reached. Such prolonged contact causes damage to the air bearings.

In order to achieve minimal contact between the shaft and the air bearings, quick acceleration is necessary, which requires efficient capture of the rotor for rotation with the stator. If the stator is simply accelerated quickly, it may fly by the rotor without capturing the rotor, in which case the stator must be decelerated again to capture the rotor, and then accelerated again. Obviously, this provides an inefficient system. Therefore, it is desirable to provide a method and apparatus for capturing, accelerating, and decelerating a sensorless magnetic rotor in a turbogenerator in a manner which minimizes the duration of contact between the rotor and the air bearings in order to prevent damage to the air bearings.

BRIEF SUMMARY OF THE INVENTION

In accordance with one aspect of the invention, a method is provided for starting a turbogenerator having a sensorless magnetic rotor supported for rotation in a stator by a compliant foil fluid film bearing. The method comprises energizing the stator to generate a continuously rotating magnetic field to capture the magnetic rotor and thereafter accelerating the rotational speed of the magnetic field to substantially minimize the time required for the magnetic rotor to reach a liftoff speed associated with the compliant foil fluid film bearing.

In another aspect of the invention, the rotor is decelerated during shutdown and the inertial energy of the rotor is dissipated by converting the inertial energy to a DC bus voltage and dissipating the DC bus voltage with an off-load device including a brake resistor.

DETAILED DESCRIPTION OF THE INVENTION

Figure 1:
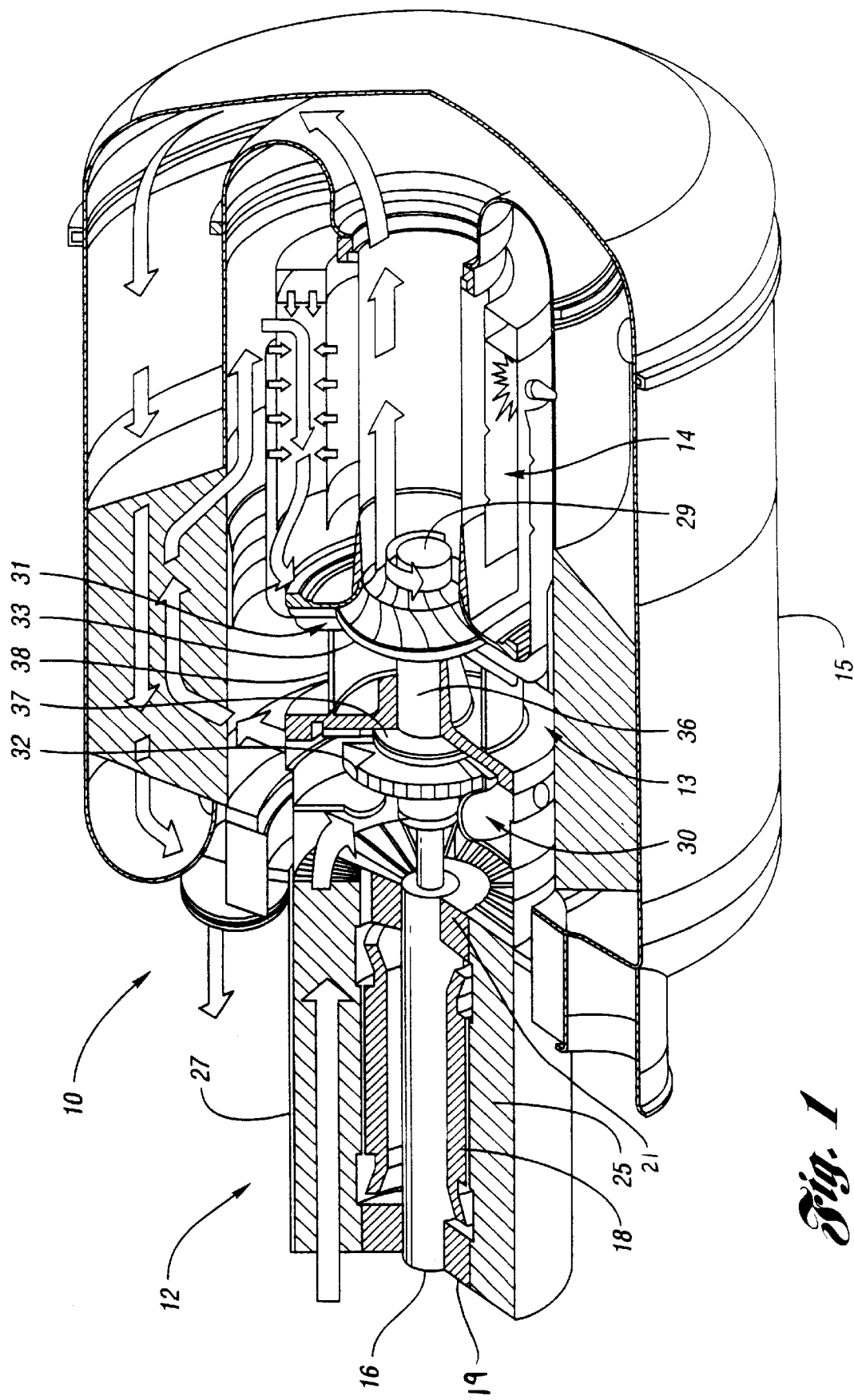
FIG. 1 shows a partial cut-away perspective view of a turbogenerator for use with the present invention.

In a first aspect, the present invention provides a method of starting a turbogenerator having a sensorless magnetic rotor supported for rotation in a stator by a compliant foil fluid film bearing by energizing the stator to generate a continuously rotating magnetic field rotating approximately 270° to 360° in approximately 1 second to capture the magnetic rotor and thereafter accelerating the rotational speed of the magnetic field to at least approximately 8,000 rpm within approximately 1 second after said rotation of approximately 270° to 360° to substantially minimize the time required for the magnetic rotor to reach a liftoff speed associated with the compliant foil fluid film bearing.

In another aspect, a turbogenerator is provided having a rotatable rotor including at least one magnet, the rotor lacking means for determining its rotational position, a compliant foil fluid film bearing positioned for supporting the rotor, a stator configured for generating a rotatable magnetic field to capture said magnet for rotating the rotor, and a control system operatively connected with the stator for energizing the stator to generate a continuously rotating magnetic field to capture the magnetic rotor and thereafter for accelerating the rotational speed of the magnetic field to at least approximately 8,000 rpm within approximately 1 second after said rotation of approximately 270° to 360° to substantially minimize the time required for the magnetic rotor to reach a liftoff speed associated with the compliant foil fluid film bearing.

In a further aspect, a method of capturing a sensorless magnetic rotor for acceleration and rotation in a stator is provided by energizing the stator to generate a continuously rotating magnetic field rotating the magnetic field in approximately 1 second to capture the magnetic rotor, and thereafter accelerating the rotational speed of the magnetic field to at least a approximately 8,000 rpm to operating speed within approximately 1 second after said rotation of approximately 270° to 360°.

In a still further aspect, a method of capturing a sensorless magnetic rotor for acceleration and rotation in a stator is provided by energizing the stator to generate a continuously rotating magnetic field to capture the magnetic rotor, thereafter accelerating the rotational speed of the magnetic field to operating speed, and decelerating the rotational speed of the magnetic field to decelerate the magnetic rotor from approximately 14,000 rpm to 0 rpm in approximately 1 second.

In another aspect, a method of capturing a sensorless magnetic rotor for acceleration, rotation and deceleration with a rotating magnetic field generated by a stator for use in a turbogenerator including a compliant foil fluid film radial bearing is provided by energizing the stator to generate the magnetic field, rotating the magnetic field approximately 360° to capture the magnetic rotor, accelerating the rotational speed of the magnetic field to minimize the time required for the magnetic rotor to reach its operating speed, thereby reaching a liftoff speed associated with the compliant foil fluid film radial bearing, and decelerating the rotational speed of the magnetic field from its operating speed to zero within approximately 1 second by decelerating a peak current of approximately 80 amps as it rotates through three inductors of a three-phase permanent magnet rotor to minimize the time required to decelerate and stop rotation of the magnetic rotor, thereby preventing prolonged contact of the rotor with the compliant foil fluid film radial bearing.

In a further aspect, a rotor assembly is provided having a rotatable rotor including at least one magnet, the rotor lacking means for determining its rotational position, a stator having a three-phase permanent magnet rotor including three inductors configured for generating a rotatable magnetic field to capture said magnet for rotating the rotor, a control system operatively connected with the stator for energizing the stator to generate a continuously rotating magnetic field to capture the magnetic rotor, and thereafter for accelerating the rotational speed of the magnetic field to minimize the time required for the magnetic rotor to reach a liftoff speed associated with the compliant foil fluid film radial bearing, and for instructing the stator to decelerate from an operating speed to zero within approximately 1 second.

In still another aspect, a method of capturing a sensorless magnetic rotor for acceleration, rotation and deceleration with a rotating magnetic field generated by a stator for use in a turbogenerator including a compliant foil fluid film radial bearing is provided by energizing the stator to generate the magnetic field, rotating the magnetic field approximately 360° to capture the magnetic rotor, accelerating the rotational speed of the magnetic field to minimize the time required for the magnetic rotor to reach its operating speed, thereby reaching a liftoff speed associated with the compliant foil fluid film radial bearing, and decelerating the rotational speed of the magnetic field from the operating speed to zero within approximately 1 second by decelerating a peak current of approximately 80 amps as it rotates through three inductors of a three-phase permanent magnet rotor.

A permanent magnet turbine generator/motor 10 is illustrated in FIG. 1 as an example of a turbogenerator in which the methods and apparatus of the present invention could be implemented. The permanent magnet turbine generator/motor 10 generally comprises a permanent magnet generator 12, a power head 13, a combustor 14, and a recuperator (or heat exchanger) 15.

The permanent magnet generator 12 includes a permanent magnet rotor 16 having a permanent magnet embedded therein, such as a samarium cobalt magnet. The rotor 16 is rotatably supported within a permanent magnet generator stator 18 by air bearings 19,21. Radial permanent magnet stator cooling fins 25 are enclosed in an outer cylindrical sleeve 27 to form an annular air flow passage which cools the stator 18 with the air passing through on its way to the power head 13.

The power head 13 of the permanent magnet turbogenerator/motor 10 includes compressor 30, turbine 31, and bearing rotor 36 through which the tie rod 29 passes. The turbine 31 drives the compressor 30, which includes a compressor impeller or wheel 32 which receives preheated air from the annular air flow passage in cylindrical sleeve 27 around the permanent magnet stator 18. The turbine 31 includes a turbine wheel 33 which receives heated exhaust gases from the combustor 14 supplied with air from recuperator 15. The compressor wheel 32 and turbine wheel 33 are rotatably supported by the rotor 36 having a radially extending bearing rotor thrust disk 37. The bearing rotor 36 is rotatably supported by a single air bearing within the center bearing housing 38 while the bearing rotor thrust disk 37 at the compressor end of the bearing rotor 36 is rotatably supported by a bilateral thrust bearing. The bearing rotor thrust disk 37 is adjacent to the thrust face at the compressor end of the center bearing housing while a bearing thrust plate is disposed on the opposite side of the bearing rotor thrust disk 37 relative to the center housing thrust face.

Intake air is drawn through the permanent magnet generator by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine 31. The expanded turbine gases are then passed through the recuperator 15 before being discharged from the turbogenerator/motor 10.

The air bearings 19,21 are preferably compliant foil fluid film radial bearings, as described in U.S. Pat. No. 5,915,841, which is hereby incorporated by reference in its entirety. The air bearing inside the center bearing housing 36 is also preferably a compliant foil fluid film radial bearing. The bilateral thrust bearing is also preferably a compliant foil fluid film thrust bearing, as described in U.S. Pat. No. 5,529,398, which is hereby incorporated by reference in its entirety.

Figure 2:
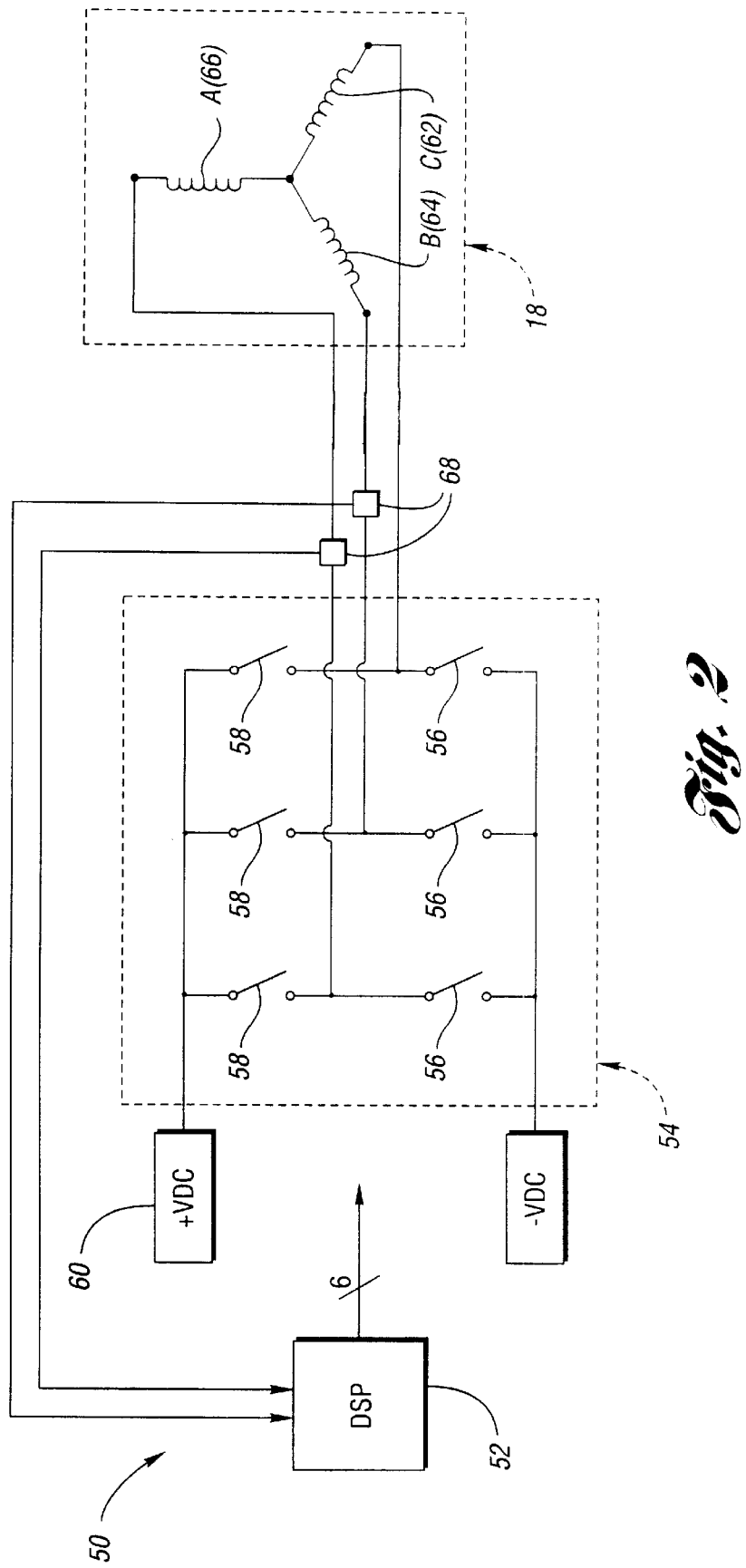
FIG. 2 shows a schematic diagram of a stator control system implementing the present invention.

As described in the background section of the present application, the challenge is to not allow the rotor 16 to rotate in contact with the air bearings for prolonged periods of time before liftoff has been reached, which is typically around 8,000 rpm. This must be achieved by quickly capturing the magnetic rotor 16 with the magnetic field generated by the stator 18, and accelerating the rotor quickly beyond the liftoff speed. This is achieved by the control system 50, shown in FIG. 2, which implements the methods of the present invention by properly energizing the stator 18 in a manner to achieve the stated objects of the present invention.

The control system 50 includes a digital signal processor 52. This is only a preferred processor, and any microcontroller could be used to implement the present invention.

The digital signal processor 52 is in electrical communication with the integrated gate bipolar transistor (IGBT) 54, which receives signals from the DSP 52 for operating switches 56,58 for selectively providing 760 volts of DC power from source 60 through selected motor inductance 62, 64, 66 of the stator/generator/motor 18.

The stator 18 is preferably a three-phase synchronous generator/motor. The stator 18 includes three inductors associated with phases A, B and C as shown. The synchronous permanent magnet generator 18 is preferably a model 330 Capstone microturbine, available from Capstone Turbine Corporation, the assignee of the present application. Two of the three inductors A, B and C have current sensors 68 thereon for control purposes.

The digital signal processor 52 includes space vector control algorithms which are operative to control the peak current associated with the three sine waves in the inductors A, B, C, thereby controlling the rotating magnetic field generated by the stator 18. A description of a space vector control algorithm may be found in Electric Machines And Drives, Chapter 10, "Induction Motor Drives", Slemon, Addison-Wesley Publishing Company, Inc., which is hereby incorporated by reference. This type of control is known in the art. Space vector control uses a current-driven induction motor. The stator current in the induction motor should have a magnetizing component of magnitude which is in space phase with the rotor flux linkage space vector. If the current magnitude is held constant, the flux linkage will be constant in magnitude at the desired value. The stator current now can be forced to have a further component which is 90° in angular space behind the rotor flux linkage. The magnitude of this component can be made proportional to the demand torque.

The required stator current is the vector sum of these two components. If this stator current could be supplied from an essentially ideal three-phase current source in which both the magnitude and the space angle can be instantaneously established, the drive theoretically would be capable of producing instantaneous torque response to a command signal. Such a controlled stator current can be produced approximately by use of a hysteresis control scheme.

Direct measurement of the angular position of the net rotor flux is not normally feasible because the path of the desired flux is deep in the rotor winding and the rotor is rotating. However, indirect methods may be employed to evaluate the angular position of the rotor flux linkage space vector. In one approach, two stator voltages and two stator currents are measured and manipulated to produce two space vectors, each as a complex number. The stator voltages may, alternatively, be inferred from the duty cycle that must be applied to the switches 56,58 to maintain current regulation. The resistance drop is subtracted from the stator voltage to give the induced voltage vector. This is then integrated to obtain the stator flux linkage from which the leakage flux linkage may be subtracted to derive the rotor flux linkage space vector. The angle of this space vector is now multiplied by the desired magnitude to obtain the space vector of the required magnetizing current. The same angle delayed by $\pi/2$ rad is then multiplied by the desired rotor current magnitude which is proportional to the demand torque. The two vector components are now added to produce the required space vector of the stator current. The hysteresis controller of the current source inverter then proceeds to produce the required instantaneous phase currents to inject into the stator windings. Normally, these operations are performed digitally.

Other versions of vector control use a shaft position sensor to obtain the angular position of the rotor and then add to this a computed angle derived from integration of the predicted rotor frequency to obtain a prediction of the angle of the rotor flux linkage. However, the present invention addresses the particular situation in which no shaft position sensor is provided on the rotor.

Referring again to FIG. 2, when the inductors A, B and C are energized, a peak amperage of 80 amps is generated in one of the inductors A, B, C, which results in −40 amps at the other two inductors B and C. When the inductors A, B, C are energized, if the magnetic rotor 16 rests in a position such that the north pole of its magnetic field is within 90° of the peak position of the current applied to stator 18, then the rotor 18 will rotate into a position of alignment with the peak current of the stator 18, and be captured by the stator 18. However, if the north pole of the magnetic rotor 16 is more than 90° out of phase with the peak current applied in the inductors A, B, C, then the peak sine wave currents must be rotated 360° through the phases A, B and C to capture the magnetic field produced by the magnet within the rotor 16 so that the rotor 16 is captured for rotation with the peak sine wave current rotated through the inductors A, B and C. In other words, three sine waves of current 120° out of phase are put into inductors A, B and C, and the peak magnitude resulting from the combination thereof captures the north pole of the magnet embedded within the rotor 16, and thus rotation of the phase position of the sine waves through the inductors A, B, C is used to cause rotation of the rotor 16.

In order to capture the rotor every time, in the preferred embodiment, the initial frequency applied to the stator 18 is one revolution per second for 1 second to capture the rotor 16. Once one revolution has been completed, the rotor 18 has been captured and the frequency is linearly increased to 14,000 rpms over the next second. This linear increase is actuated using an open loop position command. At this time, there is enough voltage applied to the inductors to begin using the commanded voltage feedback to ascertain the rotor position for closed loop position control.

Because the magnetic rotor 16 will be captured by the energized stator 18 if the north pole of the magnetic field generated by the magnetic rotor 16 is less than 90° out of phase with respect to the peak current of the inductors A, B, C, it is not necessary to slowly rotate the magnetic field of the inductors A, B, C the full 360°. For example, it could rotate 270° and would likely capture the rotor every time. However, to assure capture, the preferred method slowly rotates the magnetic field a full 360° for approximately 1 second to be sure that the rotor 16 is captured by the stator 18.

In this manner, the rotor 16 is quickly caused to reach the liftoff frequency associated with the compliant foil fluid film radial bearings 19,21, thereby minimizing damage caused to the foil of such bearings 19,21.

It is also important to decelerate the rotor as quickly as it was accelerated in order to prevent prolonged contact of the rotor with the foil of the air bearings as the rotor rotates during deceleration. During the set down process, the stator 18 is brought to 14,000 rpms from its operating speed. Once the stator reaches 14,000 rpms, it is brought to 0 rpms in 1 second to minimize contact with the foil bearings. This is accomplished by increasing the current to 80 amps peak and providing an open loop rotor position command which drags the rotor to a rest position. With a (position) sensorless control algorithm, it is difficult to actually sense the rotor position at low speeds, so applying the open loop command is critical. If commanded voltages were used as at high speed, the algorithm might miscalculate the position of the rotor, lose lock, and not be able to perform this rapid deceleration.

Figure 3:
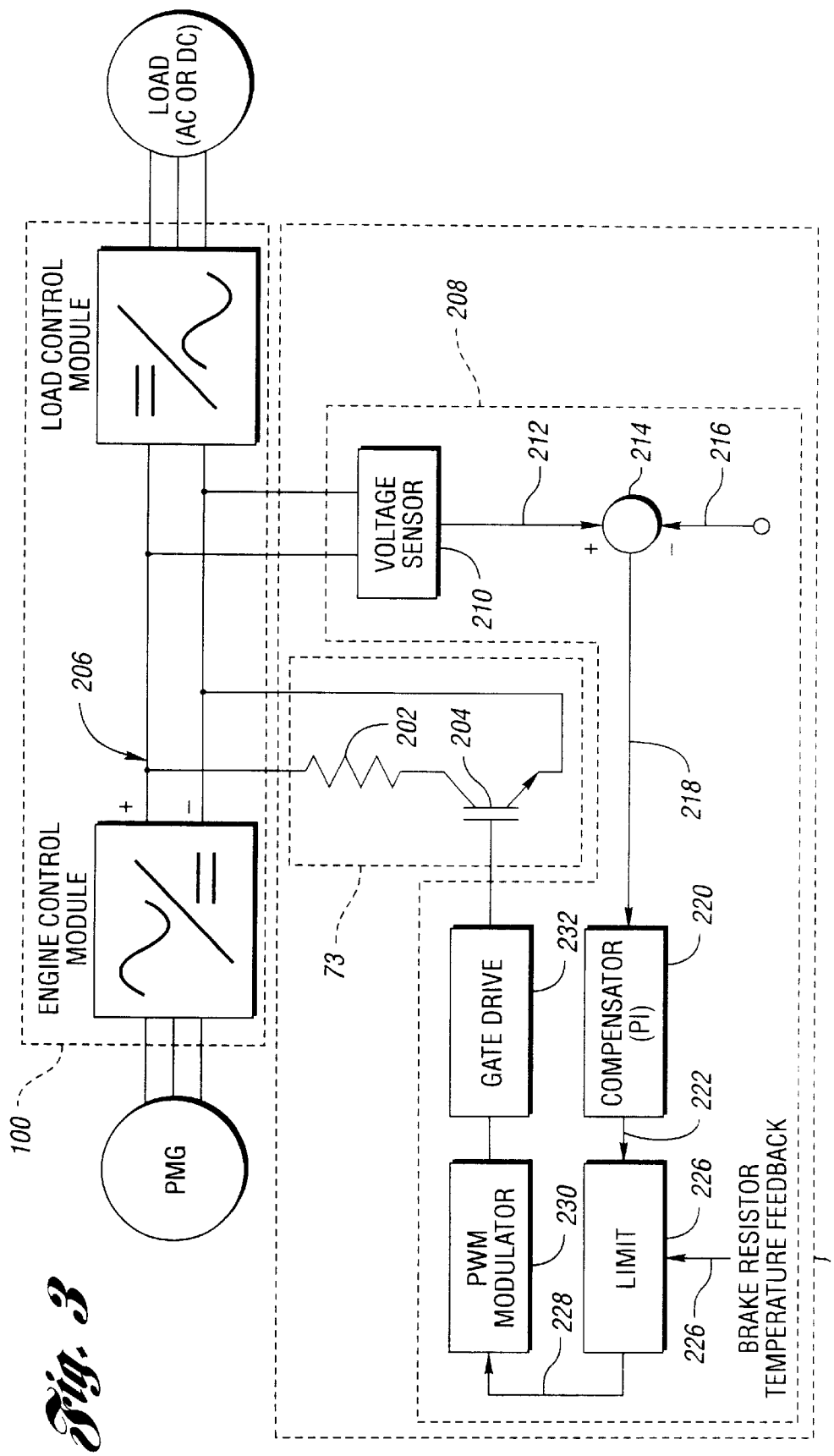
FIG. 3 shows a schematic block diagram of a preferred energy discharge system for use with the present invention.

A description of FIG. 3 is provided below to show the integration of a dynamic brake 202 into the previously described system for use in dissipating rotor inertia in the above-described braking process.

FIG. 3 illustrates a preferred energy discharge system 102 incorporating the off-load device 73. The energy discharge system 102 includes an off-load device 73 having an off-load resistor 202 and off-load switching device 204. Off-load switching device 2045 may be an IGBT or similar device. The off-load device 73 is connected across the DC voltage bus 206 and will turn on proportionately to the amount of off-load required, thus providing a load for the gas turbine engine while the fuel is being cut back to stabilize operation at a reduced level.

A preferred off-load device control loop 208, which is implemented in the DSP 52, is shown in FIG. 3 for controlling energy absorption of the off-load device 73. A voltage sensor 210 in communication with the voltage bus 206 generates a DC bus voltage feedback signal 212. Voltage feedback signal 212 is compared in summer or comparator 214 with a DC bus voltage limit signal 216. The voltage limit signal 216 is adjustable by the DSP 52 and is the maximum voltage that may exist on voltage bus 206 before the off-load device 73 is turned on and starts absorbing energy. The difference between the voltage feedback signal 212 and the voltage limit signal 216 is voltage bus error signal 218. Voltage bus error signal 218 is utilized to control the off-load device 73 to increase or decrease the amount of energy being absorbed by the off-load resistor 202. A compensator 220 utilizing proportional integral control is used to convert the error signal 218 to a recommended control signal 222. Recommended control signal 222 is limited by a limiter 224 and a limited recommended control signal 228 is produced. Limited 224 receives an off-load resistor temperature feedback signal 226 to set a maximum control value for the recommended control signal 222. The maximum control value is set to prevent thermal breakdown of the off-load resistor 202. Limited recommended control signal 228 communicates a desired conduction duration for the off-load switch 204 to the pulse width modulator 230. The pulse width modulator 230, which is in communication with a gate drive 232, commands the off-load switch 204 "on" (into conduction) for a specified time duration as dictated by the pulse width modulator. The off-load switch 204, when in conduction, allows current to flow through the off-load resistor 202 to absorb energy on the voltage bus 206. The off-load switch is modulated in the manner described until the energy produced by a load disconnection or reduction is absorbed by the off-load resistor 202 and the subsequent rise in voltage on the voltage bus is stabilized.

Using the above-described dynamic braking system, when the rotor is set down, the digital process controller decelerates the rotor at the same rate at which it is accelerated. When the rotor is set down in this manner, a significant amount of power is generated as the energy stored in the inertia of the shaft is reduced. At a rate of 20 k rpms, the rotor will generate a peak of about 2.5 kw.

Without the dynamic brake, the DC bus voltage in the DC bus 206 would rise to unacceptably high levels during the set down procedure. The dynamic brake is controlled to dissipate this energy and thus allows the rotor to be set down rapidly, minimizing wear and increasing life expectancy of the air bearings.

While the best mode for carrying out the invention has been described in detail, those familiar with the art to which this invention relates will recognize various alternative designs and embodiments for practicing the invention within the scope of the appended claims.

What is claimed is:

1. A method of starting a turbogenerator having a sensorless magnetic rotor supported for rotation in a stator by a compliant foil fluid film bearing, the method comprising:
    energizing the stator to generate a continuously rotating magnetic field rotating approximately 270° to 360° in approximately 1 second to capture the magnetic rotor; and, thereafter
    accelerating the rotational speed of the magnetic field to at least approximately 8,000 rpm within approximately 1 second after said rotation of approximately 270° to 360° to substantially minimize the time required for the magnetic rotor to reach a liftoff speed associated with the compliant foil fluid film bearing.

2. The method of claim 1, wherein said step of substantially accelerating the rotational speed comprises accelerating to approximately 14,000 rpm within approximately 1 second.

3. A turbogenerator comprising:
    a rotatable rotor including at least one magnet, said rotor lacking means for determining its rotational position;
    a compliant foil fluid film bearing positioned for supporting the rotor;
    a stator configured for generating a rotatable magnetic field to capture said magnet for rotating the rotor; and
    a control system operatively connected with the stator for:
        energizing the stator to generate a continuously rotating magnetic field to capture the magnetic rotor; and, thereafter
        accelerating the rotational speed of the magnetic field to at least approximately 8,000 rpm within approximately 1 second after said rotation of approximately 270° to 360° to substantially minimize the time required for the magnetic rotor to search a liftoff speed associated with the compliant foil fluid film bearing.

4. The turbogenerator assembly of claim 3, wherein said substantially accelerating the rotational speed comprises accelerating to approximately 14,000 rpm within approximately 1 second.

5. A method of capturing a sensorless magnetic rotor for acceleration and rotation in a stator, the method comprising:

energizing the stator to generate a continuously rotating magnetic field rotating the magnetic field in approximately 1 second to capture the magnetic rotor; and, thereafter accelerating the rotational speed of the magnetic field to at least approximately 8,000 rpm to operating speed within approximately 1 second after said rotation of approximately 270° to 360°.

6. The method of claim 5, wherein said accelerating the rotational speed comprises accelerating to approximately 14,000 rpm within approximately 1 second.

7. A method of capturing a sensorless magnetic rotor for acceleration and rotation in a stator, comprising:

energizing the stator to generate a continuously rotating magnetic field to capture the magnetic rotor; thereafter accelerating the rotational speed of the magnetic field to operating speed; and decelerating the rotational speed of the magnetic field to decelerate the magnetic rotor from approximately 14,000 rpm to 0 rpm in approximately 1 second.

8. A method of capturing a sensorless magnetic rotor for acceleration, rotation and deceleration with a rotating magnetic field generated by a stator for use in a turbogenerator including a compliant foil fluid film radial bearing, the method comprising:

energizing the stator to generate the magnetic field;

rotating the magnetic field approximately 360° to capture the magnetic rotor;

accelerating the rotational speed of the magnetic field to minimize the time required for the magnetic rotor to reach its operating speed, thereby reaching a liftoff speed associated with the compliant foil fluid film radial bearing; and decelerating the rotational speed of the magnetic field from its operating speed to zero within approximately 1 second by decelerating a peak current of approximately 80 amps as it rotates through three inductors of a three-phase permanent magnet rotor to minimize the time required to decelerate and stop rotation of the magnetic rotor, thereby preventing prolonged contact of the rotor with the compliant foil fluid film radial bearing.

9. A rotor assembly comprising:

a rotatable rotor including at least one magnet, said rotor lacking means for determining its rotational position;

a stator comprising a three-phase permanent magnet rotor including three inductors configured for generating a rotatable magnetic field to capture said magnet for rotating the rotor;

a control system operatively connected with the stator for:

energizing the stator to generate a continuously rotating magnetic field to capture the magnetic rotor; and, thereafter accelerating the rotational speed of the magnetic field to minimize the time required for the magnetic rotor to reach a liftoff speed associated with the compliant foil fluid film radial bearing, and instructing the stator to decelerate from an operating speed to zero within approximately 1 second.

10. A method of capturing a sensorless magnetic rotor for acceleration, rotation and deceleration with a rotating magnetic field generated by a stator for use in a turbogenerator including a compliant foil fluid film radial bearing, the method comprising:

energizing the stator to generate the magnetic field;

rotating the magnetic field approximately 360° to capture the magnetic rotor;

accelerating the rotational speed of the magnetic field to minimize the time required for the magnetic rotor to reach its operating speed, thereby reaching a liftoff speed associated with the compliant foil fluid film radial bearing; and decelerating the rotational speed of the magnetic field from said operating speed to zero within approximately 1 second by decelerating a peak current of approximately 80 amps as it rotates through three inductors of a three-phase permanent magnet rotor.

11. The method of claim 10, wherein said energizing the stator to generate a continuously rotating magnetic field further comprises rotating the magnetic field approximately 360°.

12. The method of claim 10, wherein said decelerating the magnetic field from its operating speed to zero comprises decelerating within approximately 1 second by decelerating a peak current of approximately 80 amps as it rotates through three inductors of a three-phase turbogenerator.

13. The method of claim 10, wherein said decelerating the rotor further comprises dissipating inertial energy of the rotor by converting the inertial energy to a DC bus voltage and dissipating the DC bus voltage with an off-load device including an off load resistor connected in series with an off-load switching device.

* * * * *